(12) United States Patent
Graefenstein et al.

(10) Patent No.: US 12,502,717 B2
(45) Date of Patent: Dec. 23, 2025

(54) COMPONENT FOR CONNECTING A CLAMPING HOLDER TO A SHAFT

(71) Applicant: Schenck RoTec GmbH, Darmstadt (DE)

(72) Inventors: Helge Graefenstein, Darmstadt (DE); Volker Binsack, Weiterstadt (DE)

(73) Assignee: Schenck RoTec GmbH, Darmstadt (DE)

( * ) Notice: Subject to any disclaimer, the term of this patent is extended or adjusted under 35 U.S.C. 154(b) by 491 days.

(21) Appl. No.: 17/923,139

(22) PCT Filed: Apr. 30, 2021

(86) PCT No.: PCT/DE2021/100392
§ 371 (c)(1),
(2) Date: Nov. 3, 2022

(87) PCT Pub. No.: WO2021/233497
PCT Pub. Date: Nov. 25, 2021

(65) Prior Publication Data
US 2023/0330753 A1      Oct. 19, 2023

(30) Foreign Application Priority Data

May 16, 2020   (DE) ..................... 10 2020 113 330.8

(51) Int. Cl.
*B23B 31/14*       (2006.01)
*F16D 1/08*        (2006.01)

(52) U.S. Cl.
CPC .......... *B23B 31/142* (2021.01); *F16D 1/0847* (2013.01); *F16D 1/0858* (2013.01); *Y10T 279/247* (2015.01)

(58) Field of Classification Search
CPC ... B23B 31/1075; B23B 31/14; B23B 31/142; F16D 1/0847; F16D 1/0858; Y10T 279/24; Y10T 279/247
See application file for complete search history.

(56) References Cited

U.S. PATENT DOCUMENTS

| 2,739,830 A | 3/1956 | Firth |
| 2,830,822 A | 4/1958 | Thompson |

(Continued)

FOREIGN PATENT DOCUMENTS

| CN | 103486144 A | 1/2014 |
| DE | 907 233 B | 3/1954 |

(Continued)

OTHER PUBLICATIONS

International Search Report in PCT/DE2021/100392, dated Aug. 30, 2021.

*Primary Examiner* — Eric A. Gates
(74) *Attorney, Agent, or Firm* — Collard & Roe, P.C.

(57) ABSTRACT

In a component for connecting a shaft to a clamping holder that can receive a rotor, the clamping holder is able to be inserted into a cup-shaped housing and is able to be fixed there by fasteners. On the housing base of the housing is a connector for connecting the housing to the shaft in a torque-proof manner. The fasteners are arranged with their base surface on the outer lateral surface of the housing, and can be brought into engagement with the clamping holder by bores present in the housing. The fasteners have at least one recess in the base surface, such that they rest with their base surface on the outer lateral surface only in some regions.

11 Claims, 2 Drawing Sheets

(56) References Cited

U.S. PATENT DOCUMENTS

Figure 1:
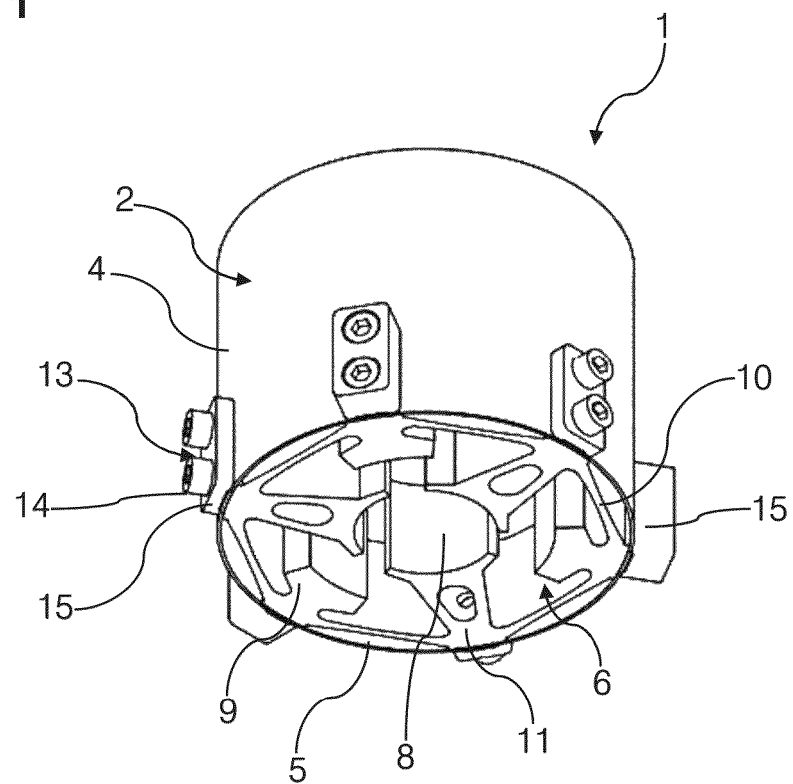

| | | | |
|---|---|---|---|
| 3,495,844 A | | 2/1970 | Dee |
| 5,071,145 A | * | 12/1991 | Brook .................. B23B 31/202 |
| | | | 279/123 |
| 5,822,837 A | | 10/1998 | Schwellenbach et al. |
| 5,845,384 A | | 12/1998 | Retzbach |
| 8,141,884 B2 | | 3/2012 | Retzbach |
| 8,257,003 B2 | * | 9/2012 | McCormick ........ B23B 31/2073 |
| | | | 409/234 |
| 10,088,033 B2 | | 10/2018 | Thelen |
| 11,448,264 B2 | * | 9/2022 | Loewen .................. F16D 1/116 |
| 2002/0112546 A1 | | 8/2002 | Shibasaki et al. |
| 2007/0090611 A1 | * | 4/2007 | Soroka ............. B23B 31/16287 |
| | | | 279/4.12 |
| 2014/0064841 A1 | | 3/2014 | Kimman et al. |

FOREIGN PATENT DOCUMENTS

| | | | | |
|---|---|---|---|---|
| DE | 15 52 197 A1 | 10/1969 | | |
| DE | 4220136 C1 | 9/1993 | | |
| DE | 195 21 755 C1 | 10/1996 | | |
| DE | 196 24 048 A1 | 12/1997 | | |
| DE | 198 34 739 C1 | 3/2000 | | |
| DE | 10 2015 101 885 A1 | 8/2016 | | |
| EP | 1 669 621 B1 | 1/2007 | | |
| EP | 2 939 772 A1 | 11/2015 | | |
| JP | S55-13133 U | 1/1980 | | |
| TW | 201412437 A | * | 4/2014 | ........... B23B 31/202 |
| WO | 00/44519 A1 | 8/2000 | | |
| WO | 2004/025154 A2 | 3/2004 | | |

\* cited by examiner

COMPONENT FOR CONNECTING A CLAMPING HOLDER TO A SHAFT

CROSS REFERENCE TO RELATED APPLICATIONS

This application is the National Stage of PCT/DE2021/100392 filed on Apr. 30, 2021, which claims priority under 35 U.S.C. § 119 of German Application No. 10 2020 113 330.8 filed on May 16, 2020, the disclosure of which is incorporated by reference. The international application under PCT article 21(2) was not published in English.

The invention relates to a component for connecting a shaft to a clamping holder that can receive a rotor, the component having a cup-shaped, thin-walled housing into which the clamping holder can be inserted, and can there be fixed by means of fastening means.

Spinning test benches are used to measure loads acting on a rotating body. In these test benches, the body, such as a rotor, is operated in its operating speed range, and also beyond it. In addition, the rotor can, for example, be subjected to cyclical rotational speed changes or temperature fluctuations. In this case, the rotor can be fastened, e.g., via its shaft journal, to a thin, elastic shaft, and accelerated. For this purpose, the rotors must be able to be easily fastened to and unfastened from the spin shaft.

Known rotor clamping holders have centrifugal segments in order to compensate for the influences of centrifugal force on the clamping of the rotor.

DE 15 52 197 C discloses a centrifugal chuck for high-speed tools, having a plurality of chuck jaws that together make up a chuck jaw ring. The centrifugal chuck has flyweights formed together with the chuck jaws, which are pivotable about a lever pivot point as two-armed levers. The flyweights are arranged between two chuck jaw rings arranged axially at a distance from one another, and are each integrally formed with one of the chuck jaws of the two chuck jaw rings. In this case, the chuck jaw rings project radially outwards between their ends to form the lever pivot points.

U.S. Pat. No. 2,830,822 A discloses a centrifugal chuck in which several weights are arranged around a rotor, and move radially outwards as a result of centrifugal force when the rotor rotates. The weights are further connected to a ring which is connected to claws which are arranged on the rotor in a manner allowing radial movement. As a result of the movement of the weights, directed radially outwards as a result of the centrifugal force, the parts of the ring which are connected to the weights are likewise compelled outwards, such that the claws, connected to the parts of the ring lying in-between, are pulled towards each other.

DE 42 20 136 C1 discloses a clamping system for machine tools for clamping rotationally-oriented tools and/or workpieces, having a chuck or base body, a clamping mechanism, base jaws, and attachment jaws. In this case, the attachment jaws consist at least partially of fiber-composite plastics, and the chuck body, the clamping mechanism, the base jaws, and the interface between the base jaws and the attachment jaws are made of a metallic material. Centrifugal balancing weights are arranged on the fiber composite plastic binding between the clamping elements, such that they are movable together with the fiber composite plastic binding in the radial direction, and are fixed in the tangential direction. When the rotational speed increases, and thus the centrifugal force increases outwards, the fiber composite plastic binding is moved outwards. Since the binding is produced from a high-rigidity carbon fiber, only a slight expansion occurs, and the tension on the clamping blocks and the workpiece in the radial direction is increased to the outside by the deformation of the fiber composite plastic binding.

Furthermore, DE 198 34 739 C1 describes a clamping device in which a polygonal-shaped base body is elastically brought into a round shape. In this case, regions of the base body located between the force application points are deformed in such a way that the holder is widened, and a round shaft can be inserted. As soon as the radial forces acting on the base body are reduced or even eliminated, the base body returns to its polygonal starting shape due to its elastic properties, and the shaft is fixed in the receptacle. EP 1 669 621 B1 proceeds from this teaching, and inserts centrifugal compensation weights in cavities that are present in the base body, such that the centrifugal compensation weights are pressed outwards due to centrifugal forces that arise. As a result, the regions lying in-between are bent inwards, and the clamping force on the shank is increased.

In order to connect the rotor held in a clamping holder to the shaft, components are provided which transmit the weight force from the rotor into the spin shaft, and transmit the drive torque from the shaft into the rotor.

DE 195 21 755 C1 describes a connection system for the purpose of repeatably fixedly connecting two components, in which one component is temporarily deformed during the connection process in such a way that an effective circumferential contour corresponds, with a prespecified clearance, to the corresponding effective circumferential contour of the other component, and in which, after the positioning process of both components, a fixed contact pressure of the two effective circumferential contours is exerted by at least partial return deformation.

Furthermore, DE 196 24 048 A1 discloses a frictional connection of two components.

DE 907 233 B describes a variable-diameter, tubular workpiece holder for machine tools, which has clamping surfaces which project beyond the diameter of the part that is to be received and which extend only over parts of the circumference thereof, which clamping surfaces can be adjusted to the workpiece diameter while producing elastic deformation of the regions of the holder lying between them.

A problem with the known components for receiving a clamping holder is that a force is exerted on the clamping holder by the clamping, and incorrect measurements can occur as a result. Particularly in the case of clamping holders with centrifugal force compensation, such a holder can influence the concentricity characteristic of the clamping holder.

The invention is based upon the object of providing a device for receiving a rotor clamping holder, in which the clamping of the rotor is not impaired by the clamping holder.

The object is achieved by the features of claim 1. Preferred embodiments are described in the dependent claims.

According to the invention, the object is achieved by providing a component for connecting a shaft to a clamping holder that can receive a rotor, the component having a cup-shaped, thin-walled housing into which the clamping holder can be inserted, and can there be fixed by means of fastening means, having on the housing base of the housing connection means for connecting the housing to the shaft in a torque-proof manner, wherein the fastening means are arranged with their base surface on the outer lateral surface of the housing and can be brought into engagement with the clamping holder by means of bores present in the housing, and have at least one recess in the base surface, such that they rest with their base surface on the outer lateral surface only in some regions, and, accordingly, a deformation of the housing is prevented in particular when the clamping holder is fixed in the housing. Advantages of the invention are that the clamping holder that can receive a rotor can be positioned in a defined manner in the cup-shaped housing and, moreover, a forced deformation of the housing is prevented by the manner according to the invention of fastening the clamping holder. This is because such a forced deformation would possibly also exert forces on the clamping holder, and thus result in an influence on the clamping or the release process of the rotor. Furthermore, the concentricity characteristic of the clamping holder is not impaired. The component according to the invention has proven to be advantageous particularly in the case of clamping holders with centrifugal compensation. The component according to the invention with its features ensures that, on the one hand, a stable connection of the clamping holder is achieved, and forces and torque are transmitted without play and with rigidity. On the other hand, the housing has a certain radial flexibility due to the thin-walled design, such that no influence is exerted on a clamping holder which compensates for centrifugal force—or more precisely, on the centrifugal components thereof. In addition, an expansion of the clamping holder, due, by way of example, to the action of a force from the outside on the clamping holder or the housing, is possible.

In one embodiment, it is provided that the fastening means comprise clamping blocks and screws, and the clamping blocks have at least one recess in their base surface. The preferred fastening is carried out in such a way that the screws are screwed through the clamping blocks or corresponding bores in the lateral surface of the housing into corresponding bores of the clamping holder. In this case, the clamping blocks are pressed by the screws onto the outer lateral surface, and the base surfaces of the clamping blocks rest against the outer lateral surface of the housing. By virtue of the fact that the fastening means—in particular, the clamping blocks—have a recess in the base surface, two linear contacts in particular result between the base surface of the clamping block and the outer lateral surface; this uniformly distributes the forces acting on the housing and prevents deformation of the housing.

It is preferred that each clamping block have at least one through-hole for a screw, and the base surface of the clamping block be cut out in the region of the through-hole. Depending upon the application, one through-hole or several through-holes for the passage of a screw or several screws is/are provided in one clamping block. The recess is in particular present in the region of the base surface of the clamping block into which the through-hole opens, which recess in particular has a diameter that is greater than the diameter of the through-hole. The recess can be milled, for example, such that there is a gap between the through-hole and the outer lateral surface.

In one embodiment, it is provided that the clamping blocks have a rectangular shape and be arranged on the outer lateral surface in such a way that their longitudinal axis is coaxial with the longitudinal axis of the housing. A rectangular shape of the clamping blocks has proven advantageous, although other shapes, such as round or polygonal clamping blocks, are also possible. Clamping blocks designed in this way have corresponding recesses in their base surface, such that they rest with their base surface on the outer lateral surface only in some regions.

It has been found to be advantageous that the recess of the base surface extends along the longitudinal axis over the entire length of a clamping block, and the width thereof is greater than the diameter of a through-hole. The recess thus extends, depending upon the design of the clamping block, over the total length and/or width of the clamping block. The width of the recess can depend upon the shape of the clamping block, wherein it is preferred that the base surface of a clamping block be cut out at least in the region of the through-hole.

Depending upon the rotor weight and/or the targeted rotational speed, it may be advantageous for there to be several through-holes in the clamping blocks along the longitudinal axis, such that a connection can be produced between the component and the clamping holder which is both secure and able to withstand high loads. The fastening of the clamping holder in the component can be adapted to the rotor type received by the clamping holder and/or the targeted rotational speed, such that it can be regarded as sufficient for certain applications that the component comprise at least three fastening means arranged at a distance from one another on the outer lateral surface. For certain applications, more than three fastening means arranged on the outer lateral surface can, accordingly, also be provided.

The housing has on its housing base connection means for connecting the housing to the shaft in a torque-proof manner. The connection means can, for example, be receptacles or recesses to which corresponding connecting means of the shaft can be connected. The connecting means of the shaft can be fastened to the corresponding receptacles or recesses of the housing base by means of screws.

In one embodiment, it is provided that the housing be a thin-walled cup which has a certain radial flexibility and thus does not impair centrifugal force compensation or the clamping process of the clamping holder. The geometry of a thin-walled cup furthermore has a sufficiently high torsional stiffness. In particular, it is advantageous for the housing wall to have a thickness of 0.3 mm to 3 mm. It has been shown that a wall thickness in this range, firstly, has sufficient stability, and, secondly, has sufficient flexibility.

In order to establish sufficient contact between the base surface of the clamping blocks and the outer lateral surface of the housing, in a preferred embodiment, the base surfaces of the clamping blocks can be shaped to be concave or flat.

Figure 2:
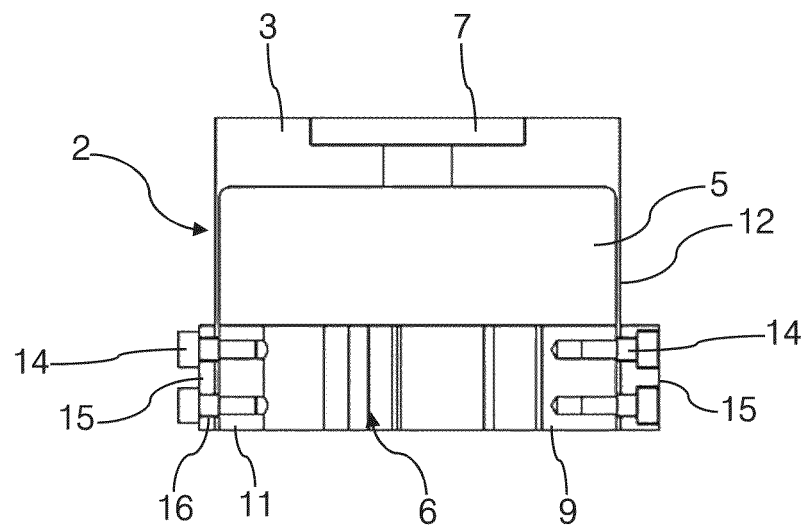
Figure 3:
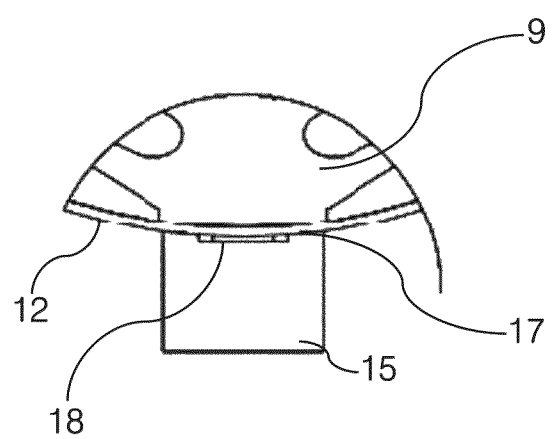

The invention is explained in more detail below with reference to embodiments which are illustrated in the drawings. In the drawings:

FIG. 1 is a perspective view of a cup-shaped component with an integrated clamping holder, FIG. 2 is a longitudinal section of the component according to FIG. 1, and FIG. 3 is an enlarged view of a clamping block.

FIG. 1 is a perspective view of a cup-shaped component with an integrated clamping holder, FIG. 2 is a longitudinal section of the component according to FIG. 1, and FIG. 3 is an enlarged view of a clamping block. The cup-shaped component 1 has a hollow cylindrical housing 2 with a housing base 3; together with its lateral surface 4, it forms a space 5 for receiving a clamping holder 6. The clamping holder 6 can be inserted in a simple manner via the open side of the housing 2. The lateral surface 4 of the housing 2 is thin-walled and can, for example, consist of metal sheet, such that the component 1 has a low weight and also has a high torsional stiffness.

Connection means 7 are provided on the housing base 3; the component 1 can be connected to a rotary drive by means of the connection means. This connection can be produced by screwing, for example, a flange connection of a shaft which is connected to the drive, designed as a connecting means, into the corresponding connection means 7, which is designed as a receptacle or recess, in the housing base 3 in a torque-proof manner. Such a shaft can, for example, be a thin, elastic spin shaft which is mounted in a spin test stand for driving a rotor.

The clamping holder 6 shown by way of example has a central recess 8 for a rotor or a rotor journal. The clamping holder 6 shown is a clamping holder 6 compensating for centrifugal force, in which centrifugal segments 9 widen outwards and, in doing so, press clamping segments 11 inwards via leaf springs 10 to clamp the rotor. The received rotor can be clamped by the fact that a force is exerted on the centrifugal segments 9 in the direction of the recess 8 from the outside, and the clamping segments 11 are thereby moved outwards via the leaf springs 10. This is merely an example of a clamping holder, since the component according to the invention is provided for a plurality of differently designed clamping holders, in which an impairment of the unclamping or clamping process by the component accommodating the clamping holder is to be prevented. The component is particularly suitable for clamping holders compensating for centrifugal force.

In order to fix the clamping holder 6 in the housing 2, fastening means 13 are arranged at a distance from one another on the outer lateral surface 12. In the example shown, the fastening means 13 are arranged close to the open cup end, such that the center of gravity of the component 1 lies at a small distance from the clamping plane. The fastening means 13 can comprise screws 14 and clamping blocks 15. The screws 14 project through through-holes 16 in the clamping blocks 15 and through corresponding bores in the housing, and are brought into engagement with corresponding bores in the clamping holder 6. For this purpose, differently positioned bores can be provided in the housing 2 and the clamping holder 6, depending upon the design of the clamping holder 6. The screw heads can rest on the surface of the clamping blocks 15 or can be countersunk in the clamping blocks 15, depending upon the design of the clamping block 15. In the embodiment shown, it is provided that the clamping holder 6 have three centrifugal segments 9 and three clamping segments 11, and one fastening means 13 be provided for fastening each of the segments 9, 11. This means that each segment 9, 11 is fastened in particular to the housing 2.

In the example shown, the clamping blocks 15 are designed to be rectangular, and lie with their longitudinal axis so as to be coaxial to the longitudinal axis of the housing 2. Two through-holes 16 are arranged along the longitudinal axis of each clamping block 15, and two screws 14 project through them. A greater or lesser number of screws 14 can be used, depending upon the type of rotor or the targeted rotational speed. Clamping blocks with only one bore are also possible. In the example shown, six clamping blocks 15 are arranged on the outer lateral surface 12 of the housing 2, wherein a greater or lesser number of clamping blocks 15 may be possible, depending upon the clamping holder. To fasten the centrifugal segments 9 and/or clamping segments 11 to the housing 2, screws 14 of different lengths can be used. In the embodiment shown, for example, the centrifugal segments 9 are fastened by means of longer screws 14 than the clamping segments 11. However, this can vary, depending upon the design of the clamping holder 6.

The clamping blocks 15 lie with their base surface 17 on the outer lateral surface 12 of the housing 2, and at least one recess 18 is provided in the base surface 17, as shown in FIG. 3. Depending upon the configuration of the clamping blocks 15, i.e., depending upon how many through-holes 16 a clamping block 15 has, it may be possible for only one recess 18 to be present in the base surface 17. It is preferred that the base surface 17 have a recess 18 in the region in which the through-hole 16 opens, such that a gap is present between the through-hole 16 and the outer lateral surface 12. The recess 18 of a clamping block 15 can extend in the direction of its longitudinal axis over its entire base surface 17, wherein the width of the recess 18 corresponds at least to the diameter of the through-hole 16. The recesses 18 advantageously have a constant height and/or depth.

In order to fix the clamping holder 6 in the component 1, the screws 14 are screwed through the clamping blocks 15 into the clamping holder 6 received in the housing 2, and accordingly press the clamping blocks 15 against the outer lateral surface 12 of the housing 2. Because the base surface 17 of the clamping blocks 15 is in particular recessed in the middle, two linear contacts arise between the clamping block 15 and the outer lateral surface 12, such that the clamping block 15 rests on the outer lateral surface 12 of the housing 2 only in some regions. The clamping block 15 therefore lies against the outer lateral surface 12 along the edges, but not in the region of the through-hole 16. As a result, the cup-shaped housing 2 is not forced into deformation, which would otherwise exert constraining forces on the clamping holder 6 and would reduce the concentricity precision of the clamping holder 6. In addition, the component 1, together with the clamping holder 6, has a high area moment of inertia in all spatial directions, and thus ensures high rigidity and consequently a defined position of the clamping holder 6.

Further advantages of the invention are, inter alia, that a high torsional stiffness is achieved by the geometry of the component 1, even though the component 1 also has a radial flexibility due to its thin-walled design which does not adversely affect the clamping holder 6, but, rather, permits certain radial movements of the clamping holder 8. As a result, the effect of the centrifugal forces on the clamping holder 8 is not adversely affected, and the rotor and/or rotor journal is reliably clamped.

Although the component 1 according to the invention is radially resilient, a clamping holder 6 can be rigidly connected by the fastening means 13 according to the invention in all required spatial/angular directions.

Specifically, it has been shown that the component 1 advantageously enables the following movements of the clamping holder 8:

The centers of gravity of the centrifugal segments 9 are pushed outwards by centrifugal force, as a result of which the clamping force is increased with increasing rotational speed.

For unclamping, the component 1 and consequently the clamping holder 8 can be deformed by an external force, such that the internal clamping is released, and the clamped rotor can be removed.

After the clamping process, the component 1 can again deform back into its original shape and can have high concentricity.

The invention claimed is:

1. A component for connecting a shaft to a clamping holder that can receive a rotor, the component having a cup-shaped, thin-walled housing into which the clamping holder can be inserted, and can there be fixed by fasteners, having on a housing base of the housing housing connectors for connecting the housing to the shaft without play, wherein each fastener of the fasteners has a base surface arranged on an outer lateral surface of the housing and can be brought into engagement with the clamping holder using bores present in the housing, and has at least one recess in the base surface, such that the base surface rests on the outer lateral surface only in some regions.

2. The component according to claim 1, wherein the fasteners comprise clamping blocks and screws, and each clamping block of the clamping blocks has the base surface and the at least one recess in the base surface.

3. The component according to claim 2, wherein each clamping block has at least one through-hole for the screw, and the base surface is cut out in the region of the through-hole.

4. The component according to claim 3, wherein the recesses each have a diameter that is greater than the diameter of the through-hole.

5. The component according to claim 3, wherein several through-holes are present in the clamping blocks along the longitudinal axis.

6. The component according to claim 2, wherein each clamping block has a rectangular shape and a longitudinal axis and is arranged on the outer lateral surface in such a manner that the longitudinal axis is coaxial with a longitudinal axis of the housing.

7. The component according to claim 6, wherein each clamping block has at least one through-hole for the screw, and wherein the recess of the base surface extends along the longitudinal axis of the clamping block over the entire length of the clamping block, and has a width greater than the diameter of the at least one through-hole.

8. The component according to claim 2, wherein the base surface of each clamping block of the clamping blocks is concave or flat in shape.

9. The component according to claim 1, wherein the shaft has shaft connectors corresponding to the housing connectors and each housing connector of the housing connectors comprise a receptacle or a recess to which a corresponding shaft connector of the shaft can be connected.

10. The component according to claim 1, wherein the housing wall has a thickness of 0.3 mm to 3 mm.

11. The component according to claim 1, wherein the component comprises at least three fasteners arranged at a distance from one another on the outer lateral surface.

* * * * *